US012005013B2

(12) United States Patent
Cutler et al.

(10) Patent No.: US 12,005,013 B2
(45) Date of Patent: *Jun. 11, 2024

(54) PATIENT SUPPORT APPARATUS WITH ARTICULATING FOWLER DECK SECTION TRAVELING THROUGH ARCUATE PATH

(71) Applicant: Stryker Corporation, Kalamazoo, MI (US)

(72) Inventors: Matthew A. Cutler, Portage, MI (US); Christopher Ryan Sweeney, Portage, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/080,127

(22) Filed: Dec. 13, 2022

(65) Prior Publication Data

US 2023/0108585 A1 Apr. 6, 2023

Related U.S. Application Data

(63) Continuation of application No. 16/596,218, filed on Oct. 8, 2019, now Pat. No. 11,554,063.

(60) Provisional application No. 62/742,670, filed on Oct. 8, 2018.

(51) Int. Cl.
*A61G 7/015* (2006.01)
*A61G 7/018* (2006.01)
*A61G 7/05* (2006.01)

(52) U.S. Cl.
CPC ............. *A61G 7/015* (2013.01); *A61G 7/018* (2013.01); *A61G 7/0507* (2013.01)

(58) Field of Classification Search
CPC ................................ A61G 7/015; A61G 7/018
See application file for complete search history.

(56) References Cited

U.S. PATENT DOCUMENTS 5,127,034 A 6/1992 Wright
5,388,290 A 2/1995 Shirai
5,469,591 A 11/1995 Nomura
5,774,914 A 7/1998 Johnson et al.
7,325,265 B2 2/2008 Hornbach et al.
7,895,689 B2 3/2011 Hayes et al.
8,418,291 B2 4/2013 Hornbach et al.
8,806,682 B2 8/2014 Hornbach et al.
8,955,178 B2 2/2015 Robertson (Continued)

*Primary Examiner* — Eric J Kurilla
(74) *Attorney, Agent, or Firm* — Howard & Howard Attorneys PLLC

(57) ABSTRACT

A patient support apparatus includes a support frame and a patient support deck operatively attached to the support frame. The patient support deck includes an adjacent pair of deck sections. An actuator is coupled to a first one of the adjacent deck sections, and the actuator, in combination with a deck articulating assembly, moves the first one of the adjacent deck sections relative to the support frame and second one of the adjacent pair of deck sections between an initial configuration and a raised configuration. In the raised configuration, the inner adjacent end of the first deck section is spaced further from the corresponding inner adjacent end of the second deck section, and the outer end opposite the inner adjacent end of the first one of the adjacent deck sections is spaced further away from the support frame, than in the initial configuration.

15 Claims, 12 Drawing Sheets

(56) References Cited

U.S. PATENT DOCUMENTS

| | | | |
|---|---|---|---|
| 9,907,714 B2 | 3/2018 | Malvestio | |
| 10,383,452 B2 | 8/2019 | Nomura et al. | |
| 11,554,063 B2 * | 1/2023 | Cutler | A61G 7/015 |
| 2002/0174487 A1 | 11/2002 | Kramer et al. | |
| 2002/0178502 A1 | 12/2002 | Beasley et al. | |
| 2005/0039263 A1 | 2/2005 | Reed et al. | |
| 2010/0212087 A1 | 8/2010 | Leib et al. | |
| 2016/0058639 A1 | 3/2016 | Lacasse et al. | |
| 2016/0227929 A1 | 8/2016 | Paul et al. | |
| 2016/0302985 A1 | 10/2016 | Tessmer et al. | |
| 2019/0191880 A1 | 6/2019 | Sweeney | |
| 2020/0107983 A1 | 4/2020 | Cutler et al. | |

* cited by examiner

FIG. 8
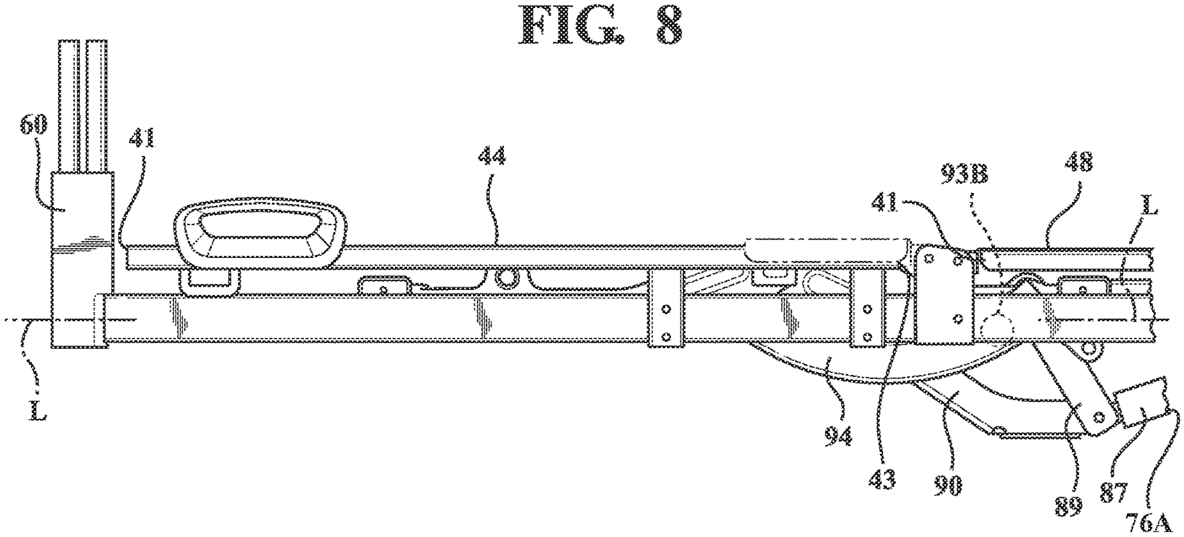
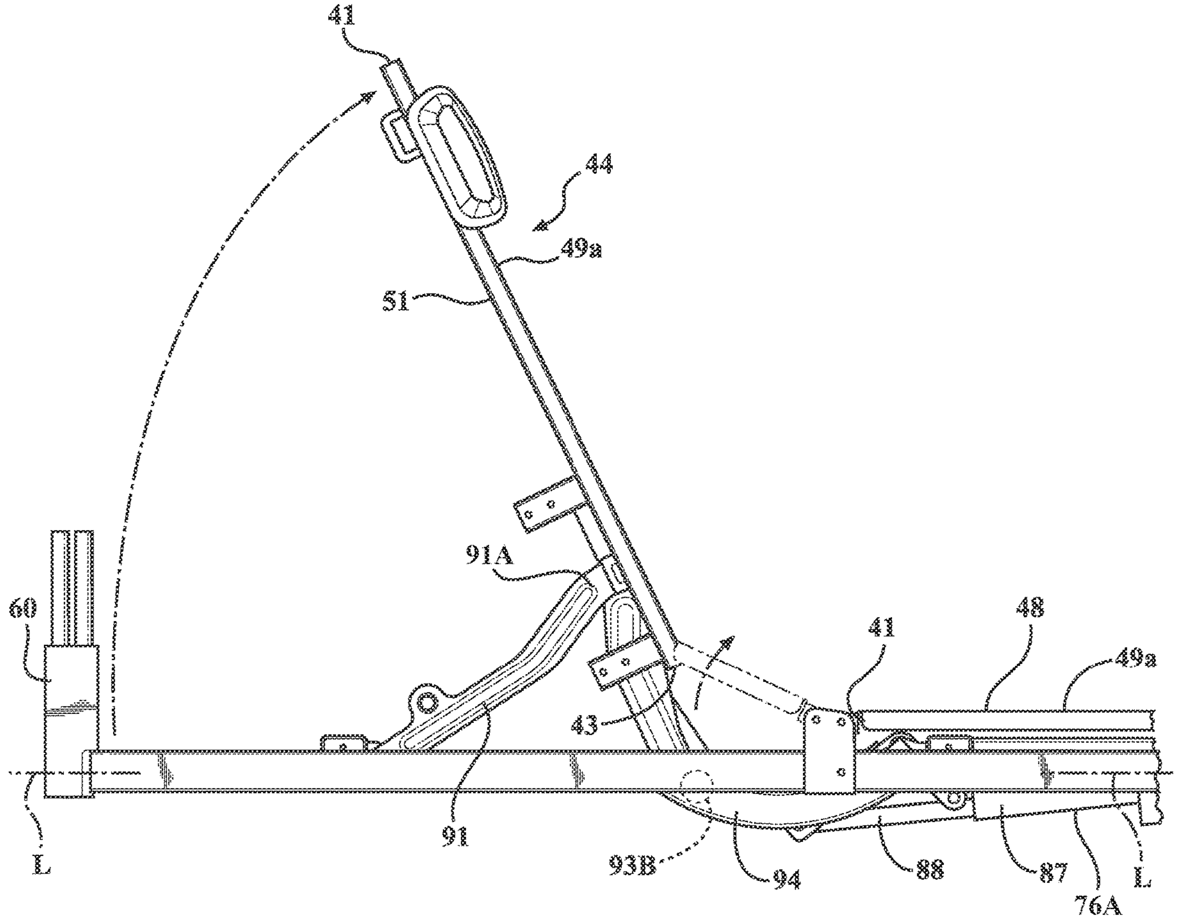
FIG. 9

FIG. 10
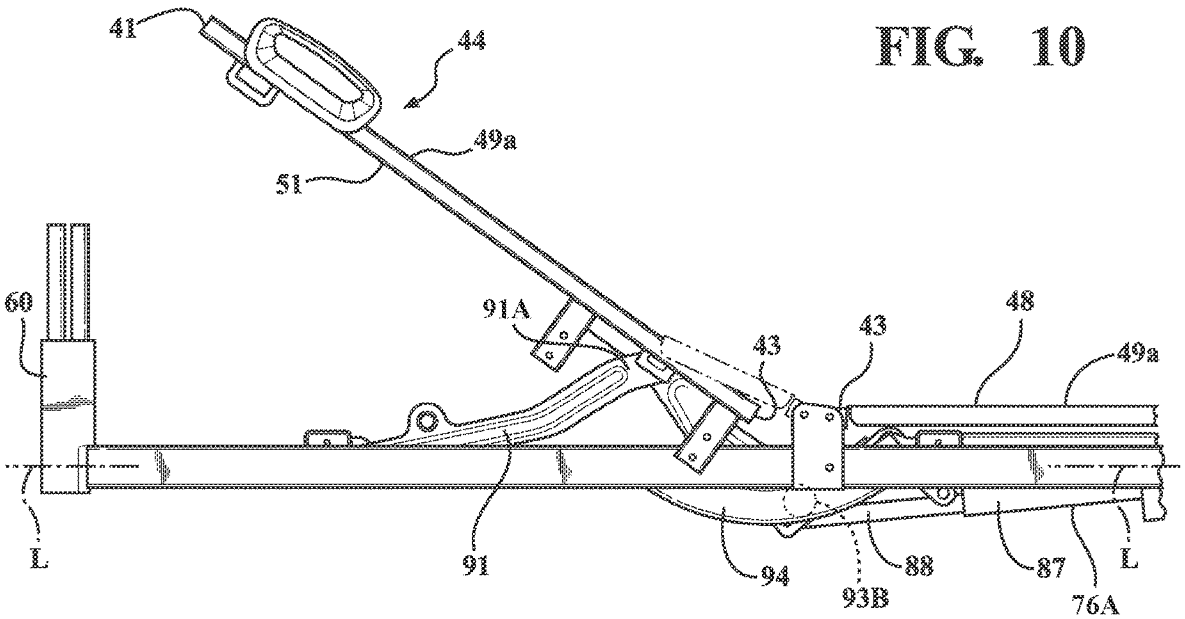
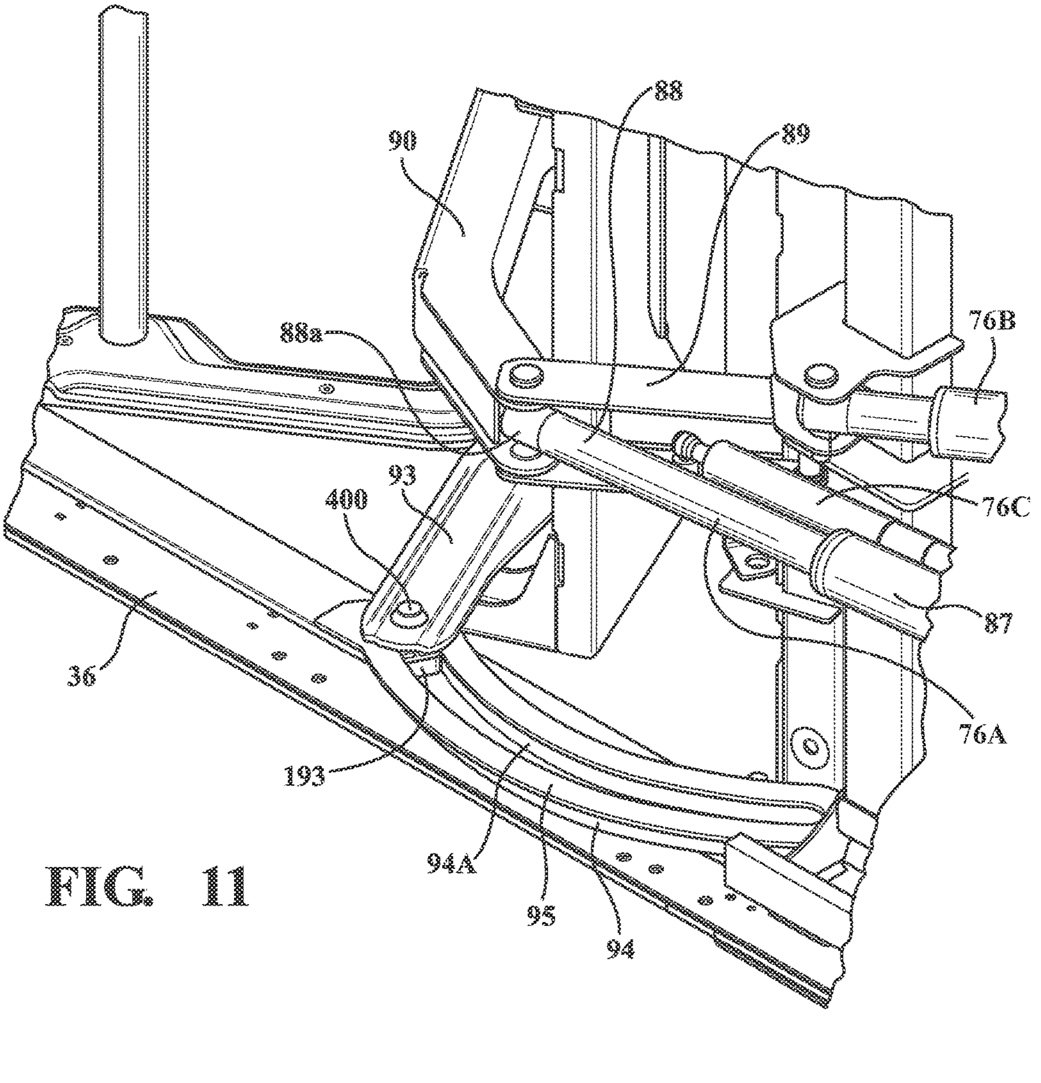
FIG. 11

FIG. 14
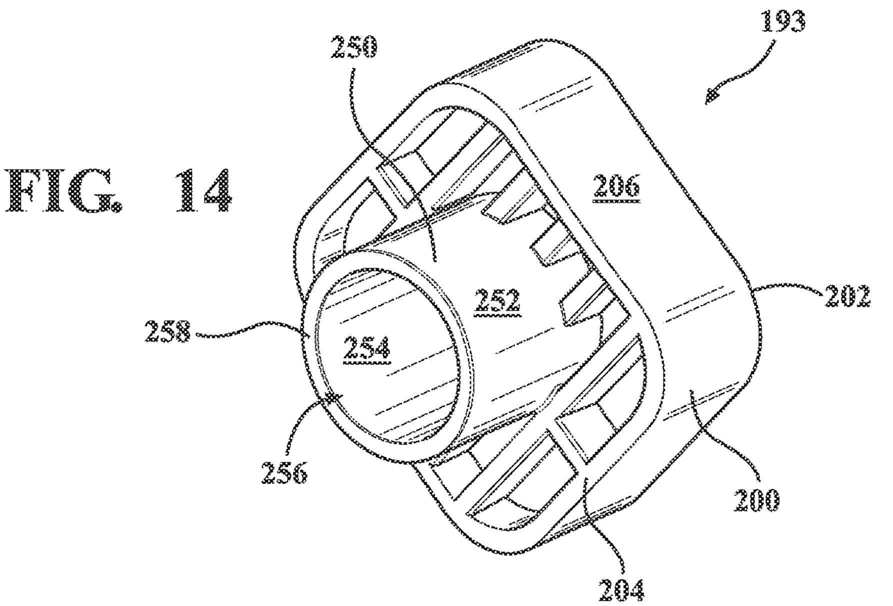
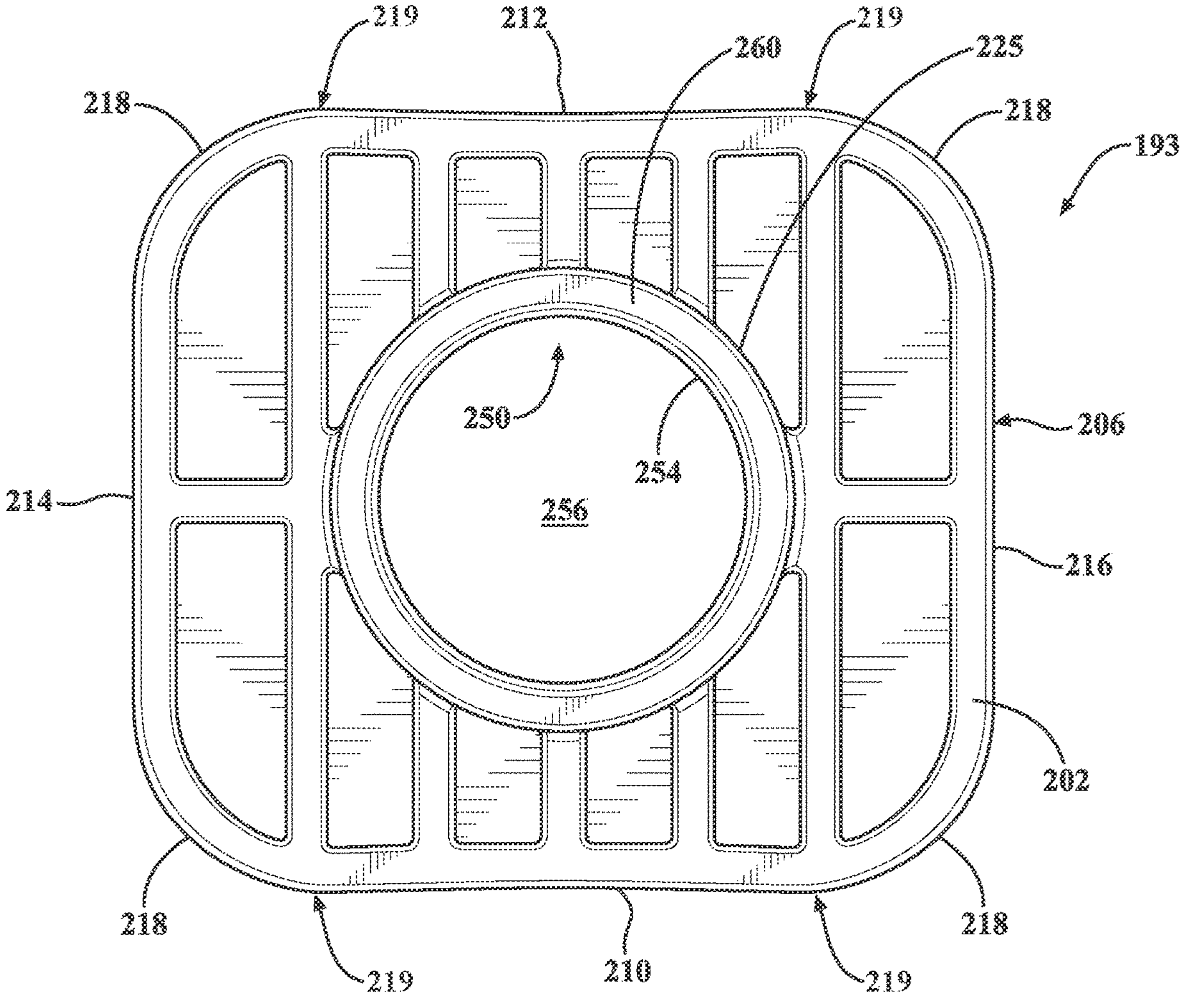
FIG. 15

PATIENT SUPPORT APPARATUS WITH ARTICULATING FOWLER DECK SECTION TRAVELING THROUGH ARCUATE PATH

CROSS-REFERENCE TO RELATED APPLICATIONS

This application is a Continuation of U.S. patent application Ser. No. 16/596,218, filed on Oct. 8, 2019, which claims priority to and the benefit of U.S. Provisional Patent Application No. 62/742,670, filed on Oct. 8, 2018, the disclosures of each of which are hereby incorporated by reference in their entirety.

BACKGROUND

Patient support apparatuses, such as hospital beds, stretchers, cots, tables, wheelchairs, and chairs, facilitate care of patients in a health care setting. Conventional patient support apparatuses comprise a base, a support frame upon which the patient is supported, a patient support deck operatively attached to the support frame, and actuators arranged to move sections of the patient support deck relative to the support frame. A mattress is typically included on the patient support deck.

It is sometimes desirable for the actuators to move, such as by articulation (e.g., pivoting), one or more of the sections of the patient support deck to a predetermined maximum raised configuration to promote enhanced patient comfort. In particular, with respect to a fowler deck section (back section), it is desirable that the movement to the maximum raised configuration be accomplished by the rearward and upward motion of the fowler deck section along a defined path. Preferably, the defined path is an arcuate path that provides maximum patient comfort during the movement. In a typical patient support apparatus, the actuator employed to move the fowler deck section is a linear actuator pivotally connected directly to the fowler deck section and the support frame. As a result, placement of the linear actuator between the fowler deck section and the support frame is limited.

A patient support apparatus designed to address one or more of the aforementioned challenges is desired.

BRIEF DESCRIPTION OF THE DRAWINGS

FIG. 8 is a side view of FIG. 4.

FIG. 9 is a side view of FIG. 6.

FIG. 10 is a side view of the patient support deck in an intermediate configuration.

FIG. 11 is a perspective view of a portion of the support frame and a patient support deck, shown with a guide member realized as a sliding block member.

FIG. 14 is a perspective view of the sliding block member of FIGS. 11-13.

FIG. 15 is a bottom view of the sliding block member of FIG. 14.

DETAILED DESCRIPTION

Figure 1:
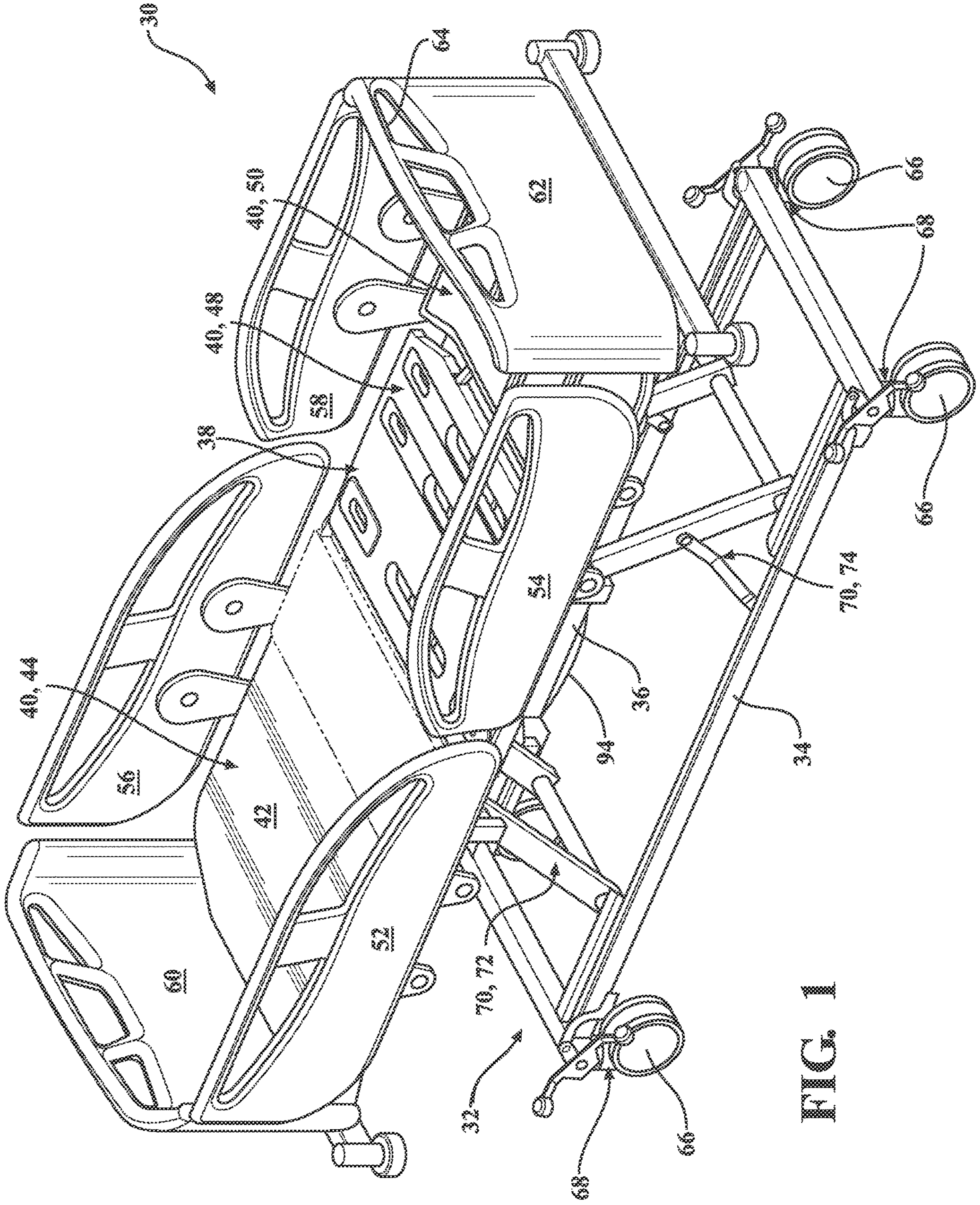
FIG. 1 is a perspective view of a patient support apparatus.

Referring to FIG. 1, a patient support apparatus 30 is shown for supporting a patient in a health care setting. The patient support apparatus 30 illustrated in FIG. 1 is realized as a hospital bed. In other embodiments, however, the patient support apparatus 30 may be a stretcher, cot, table, wheelchair, chair, or similar apparatus utilized in the care of a patient.

Figure 2:
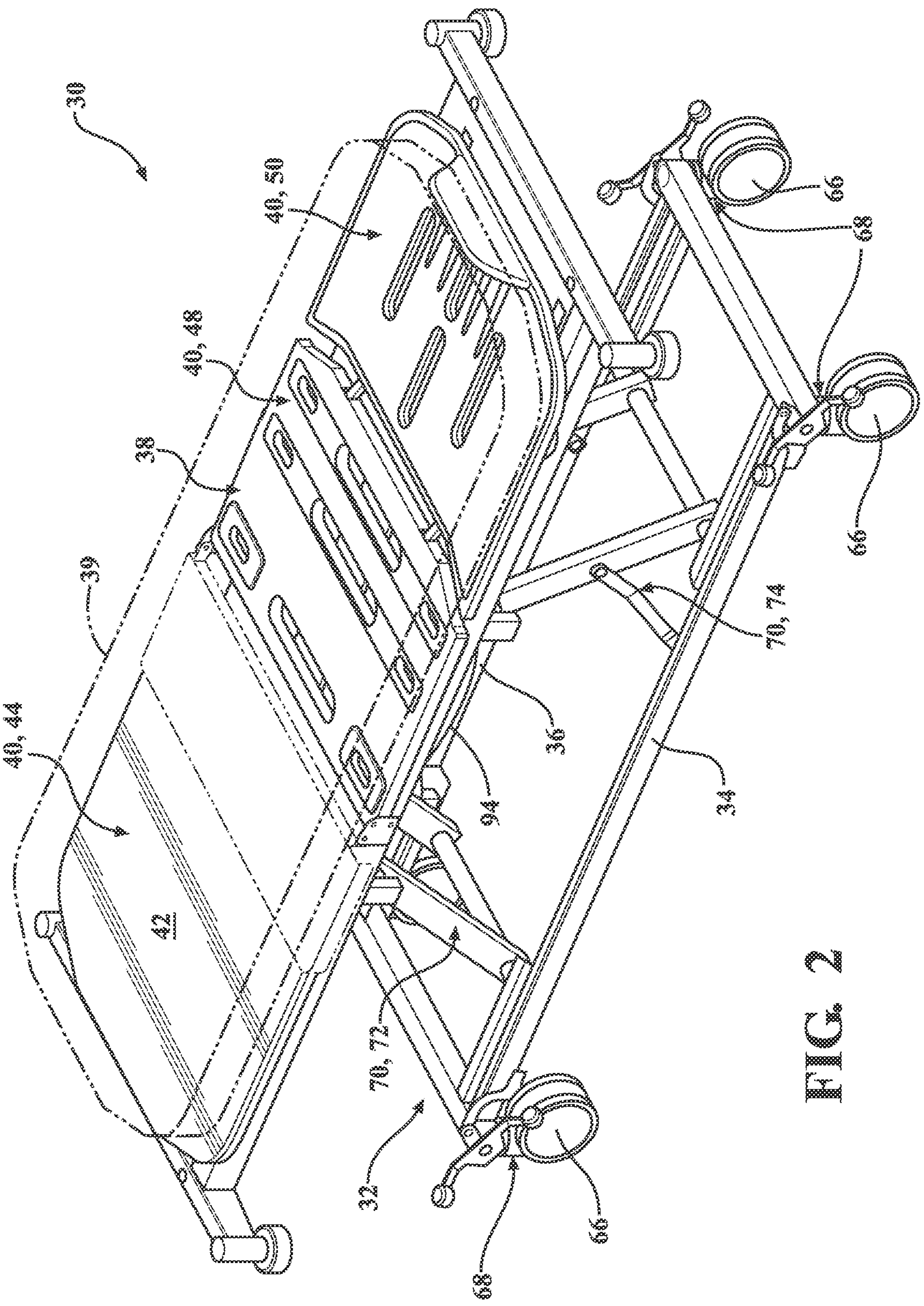
FIG. 2 is a perspective view of a portion of the patient support apparatus of FIG. 1, showing a base, a lift system, a support frame, and a patient support deck.

A support structure 32 provides support for the patient. The support structure 32 illustrated in FIGS. 1 and 2 comprises a base 34 and a support frame 36. The support frame 36 is spaced above the base 34 in FIGS. 1 and 2. The support structure 32 also comprises a patient support deck 38 operatively attached to the support frame 36 and carried by the support frame 36.

The patient support deck 38 includes a plurality of deck sections 40 that provide a patient support surface 42 upon which the patient is supported. More specifically, in the representative embodiment of the patient support apparatus 30 illustrated herein, the patient support deck 38 has three, or four, deck sections 40 which cooperate to define the patient support surface 42: a fowler deck section 44 (or back deck section), an optional seat deck section (not shown), a leg deck section 48 and a foot deck section 50. The seat deck section, when present, may be fixed to the support frame 36 and not arranged for movement relative thereto, but in some versions the seat deck section is movable. The fowler deck section 44 and the leg deck section 48 are arranged for independent movement relative to each other and to the support frame 36, and the foot deck section 50 is arranged to move partially concurrently with the leg deck section 48, as is described in greater detail below.

Figure 3:
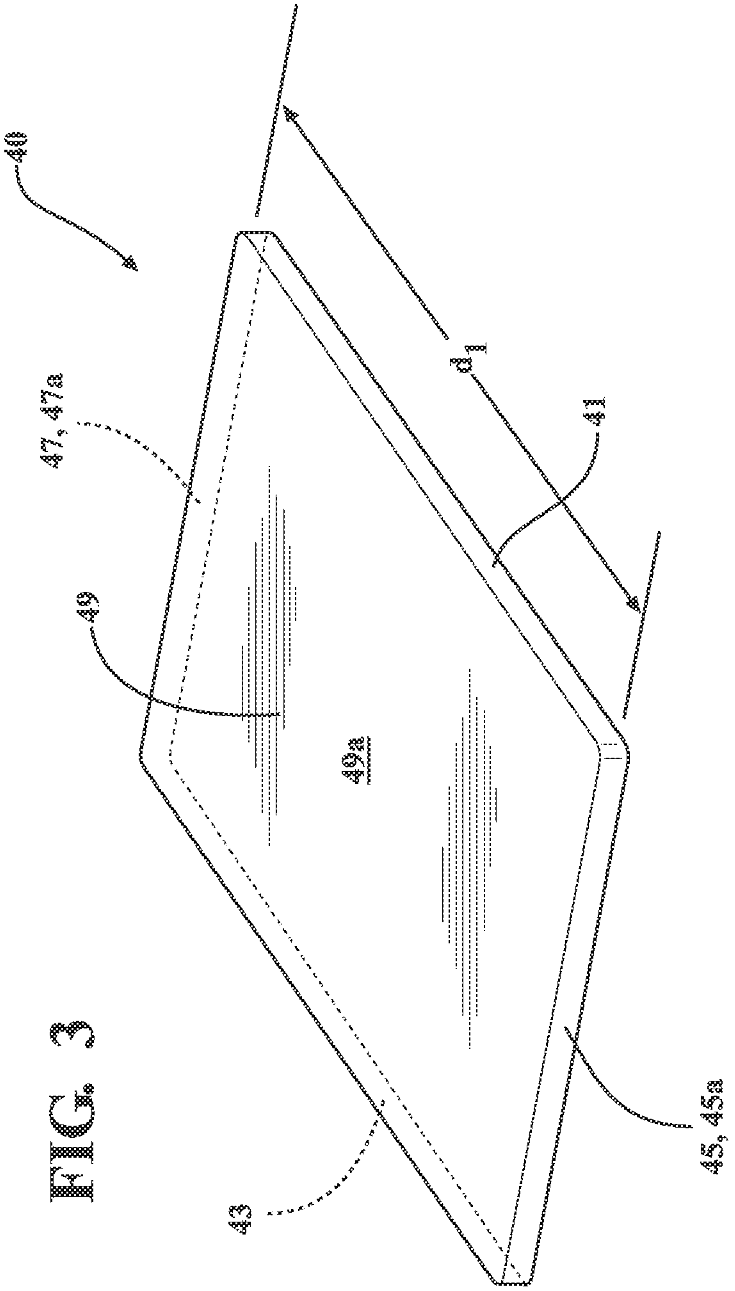
FIG. 3 is a perspective view of one of the deck sections of the patient support deck of FIG. 2.
Figure 4:
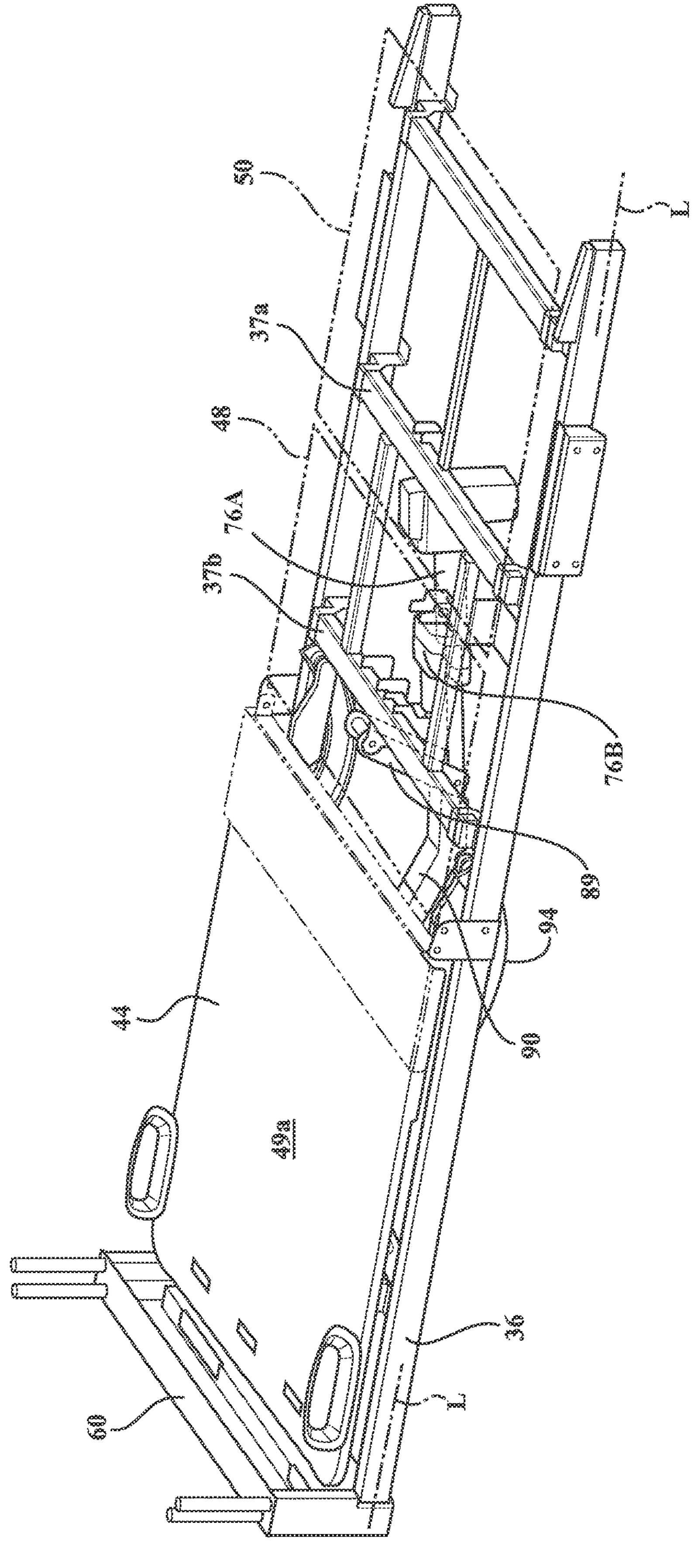
FIG. 4 is a perspective view of a portion of the support frame and patient support deck including a fowler deck section, with the fowler deck section positioned in an initial configuration.

In general, and as best illustrated in FIG. 3, each of the respective deck sections 40 includes a first edge portion 41, a second edge portion 43 spaced from and opposite the first edge portion 41, and a pair of spaced apart side edge portions 45, 47 that respectively connect the first and second edge portions 41, 43. The deck sections 40 also include a generally flat top panel portion 49 that extends between the respective edge portions 41, 43, 45, and 47. The deck sections also have a bottom portion 51 (see FIG. 5) opposing the generally flat top portion 49. The side edge portions 45, 47 each include a respective outer surface 45*a*, 47*a* that are separated by a distance d1. The flat top portion 49 has a top surface 49*a*.

Referring back to FIG. 1, side rails 52, 54, 56, 58 are coupled to the support frame 36 and/or the patient support deck 38 (e.g., the fowler deck section 44), and are thereby supported by the base 34. A first side rail 52 is positioned at a right head end of the support frame 36. A second side rail 54 is positioned at a right foot end of the support frame 36. A third side rail 56 is positioned at a left head end of the support frame 36. A fourth side rail 58 is positioned at a left foot end of the support frame 36. The first side rail 52 and the third side rail 56 may be mounted to the fowler deck section 44 to articulate with the fowler deck section 44, while the second side rail 54 and the fourth side rail 58 are mounted to the support frame 36 to move with the support frame 36. Other arrangements are also possible. If the patient support apparatus 30 is a stretcher or a cot, there may be fewer side rails. The side rails 52, 54, 56, 58 are movable between a raised position in which they block ingress and egress into and out of the patient support apparatus 30, one or more intermediate positions, and a lowered position in which they are not an obstacle to such ingress and egress. The distance d2 between a respective pair of the side rails 52, 56, and 54, 58 is greater than the distance d1 between the respective outer surface 45*a*, 47*a* of the deck sections 40. It will be appreciated that the patient support apparatus 30 may employ a different number of side rails, such as with a stretcher or a cot equipped with fewer side rails. Moreover, it will be appreciated that in certain configurations, the patient support apparatus 30 may not include any side rails.

A mattress (shown in phantom as 39 in FIG. 2) is disposed on the patient support deck 38 during use. In particular, the mattress 39 is disposed along the flat top portion 49 of each one of the respective deck sections 40 as described above. The mattress 39 comprises a secondary patient support surface upon which the patient is supported. The base 34, support frame 36, and patient support deck 38 each have a head end and a foot end corresponding to designated placement of the patient's head and feet on the patient support apparatus 30. The construction of the support structure 32 may take on any known or conventional design, and is not limited to that specifically set forth above. In addition, the mattress 39 may be omitted in certain embodiments, such that the patient rests directly on the patient support surface 42 of each of the respective deck sections 40.

As also shown in FIG. 1, a headboard 60 and a footboard 62 are coupled to the support frame 36. However, it will be appreciated that the headboard 60 and/or footboard 62 may be coupled to other locations on the patient support apparatus 30, such as the base 34, or may be omitted in certain embodiments.

One or more caregiver interfaces 64, such as handles, are shown integrated into the headboard 60, footboard 62, and the side rails 52, 54, 56, 58 to facilitate movement of the patient support apparatus 30 over floor surfaces. Additional caregiver interfaces 64 may be integrated into other components of the patient support apparatus 30. The caregiver interfaces 64 are graspable by the caregiver to manipulate the patient support apparatus 30 for movement. It will be appreciated that the caregiver interfaces 64 could be integrated with or operatively attached to any suitable portion of the patient support apparatus 30, or may be omitted in certain embodiments.

Wheels 66 are coupled to the base 34 to facilitate transport over the floor surfaces. The wheels 66 are arranged in each of four quadrants of the base 34 adjacent to corners of the base 34. In the embodiment shown, the wheels 66 are caster wheels able to rotate and swivel relative to the support structure 32 during transport. Each of the wheels 66 forms part of a caster assembly 68. Each caster assembly 68 is mounted to the base 34. It should be understood that various configurations of the caster assemblies 68 are contemplated. In addition, in some embodiments, the wheels 66 are not caster wheels and may be non-steerable, steerable, non-powered, powered, or combinations thereof. Additional wheels are also contemplated. For example, the patient support apparatus 30 may comprise four non-powered, non-steerable wheels, along with one or more powered wheels. In some cases, the patient support apparatus 30 may not include any wheels. In other embodiments, one or more auxiliary wheels (powered or non-powered), which are movable between stowed positions and deployed positions, may be coupled to the support structure 32. A fifth wheel may also be arranged substantially in a center of the base 34.

The patient support apparatus 30 further comprises a lift assembly, generally indicated at 70, which operates to lift and lower the support frame 36 relative to the base 34. The lift assembly 70 is configured to move the support frame 36 from a minimum height to a maximum height, or to any desired position in between. To that end, the lift assembly 70 comprises a head end lift member 72 and a foot end lift member 74 which are arranged to facilitate movement of the support frame 36 with respect to the base 34 using one or more lift actuators (not shown). The lift actuators may be realized as linear actuators, rotary actuators, or other types of actuators, and may be electrically operated, hydraulic, electro-hydraulic, or the like. It is contemplated that, in some embodiments, only one lift member and one associated actuator may be employed, e.g., to raise only one end of the support frame 36. The construction of the lift assembly 70, the head end lift member 72, and/or the foot end lift member 74 may take on any known or conventional design, and is not limited to that specifically illustrated. One exemplary lift assembly that can be utilized on the patient support apparatus 30 is described in U.S. Patent Application Publication No. 2016/0302985, entitled "Patient Support Lift Assembly", which is hereby incorporated herein by reference in its entirety.

In each of the representative embodiments described herein, the patient support deck 38 is operatively attached to the support frame 36 and one or more of the deck sections 40 are arranged for individual movement relative to the support frame 36. To that end, one or more actuators coupled to a deck articulating assembly 81 are arranged to move the respective one or more of the deck sections 40 relative to the support frame 36.

Referring to FIGS. 4-10, in the representative embodiment illustrated, a first actuator 76A is illustrated and described that is used, in combination with a deck articulating assembly 81 (see FIG. 5), to move one of the moveable deck sections 40, here the fowler deck section 44, between an initial configuration (see FIGS. 4, 5 and 8) and a raised configuration (see FIGS. 6, 7 and 9) and optionally to one or more intermediate configurations (see FIG. 10) between the initial and raised configuration. The first actuator 76A is realized in the representative embodiment as an electric linear actuator disposed in force-translating relationship between the fowler deck section 44 and the support frame 36. One or more additional actuators can be included to raise or lower the other respective moveable deck sections 40, such as for instance the leg deck section 48 and/or the foot deck section 50. See, for example, a second actuator 76B realized as a second electric linear actuator, which is illustrated in FIGS. 4-7 and used to move the leg deck section 48. The actuators may be realized as linear actuators, rotary actuators, or other types of actuators, and may be electrically operated, hydraulic, electro-hydraulic, or the like.

For ease of description hereinafter, the description of the actuator 76A is directed to the movement of the fowler deck section 44, although in further embodiments (not shown) the actuator 76A could be coupled to and used to move any other moveable deck section 40.

Figure 5:
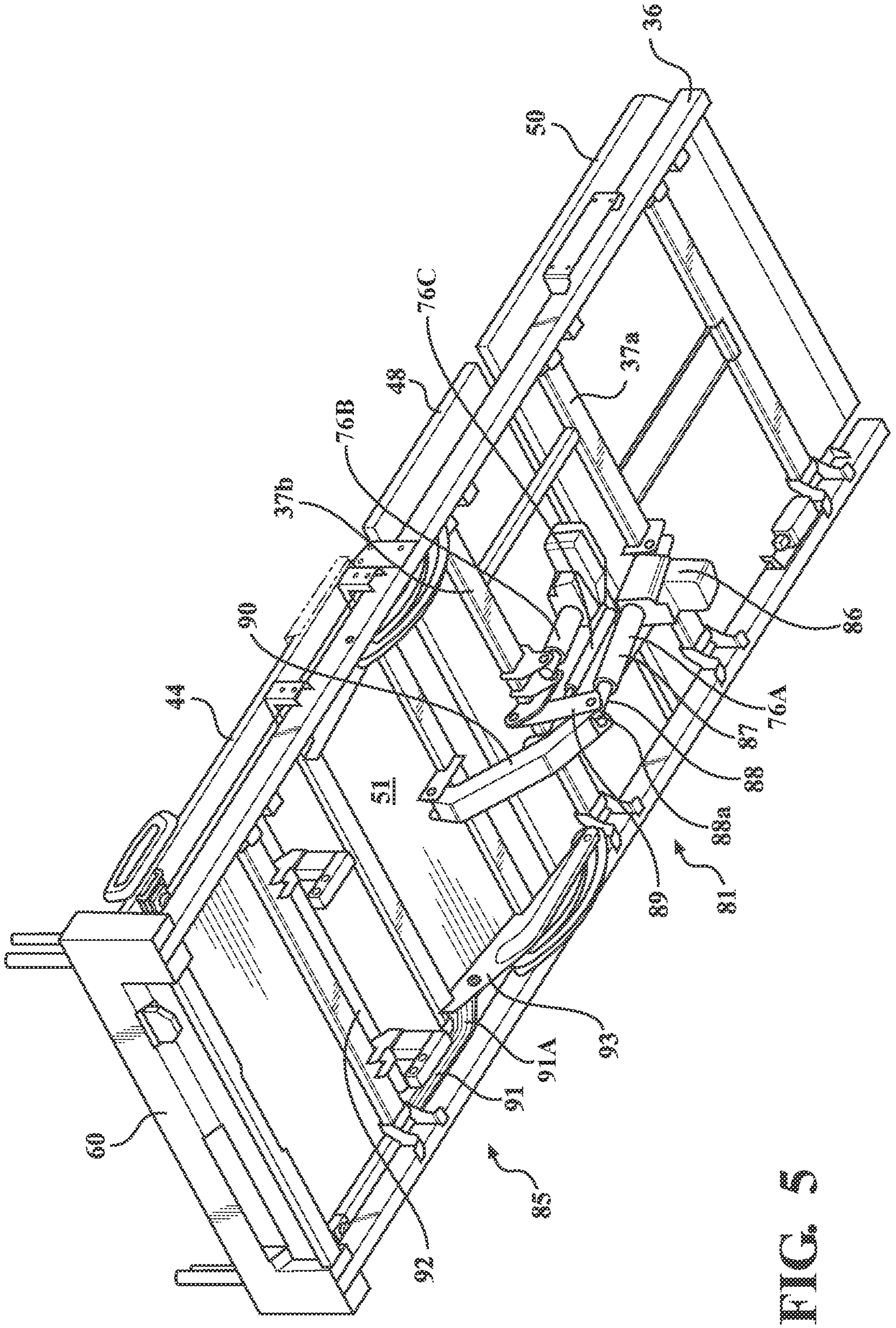
FIG. 5 is a bottom perspective view of FIG. 4.
Figure 6:
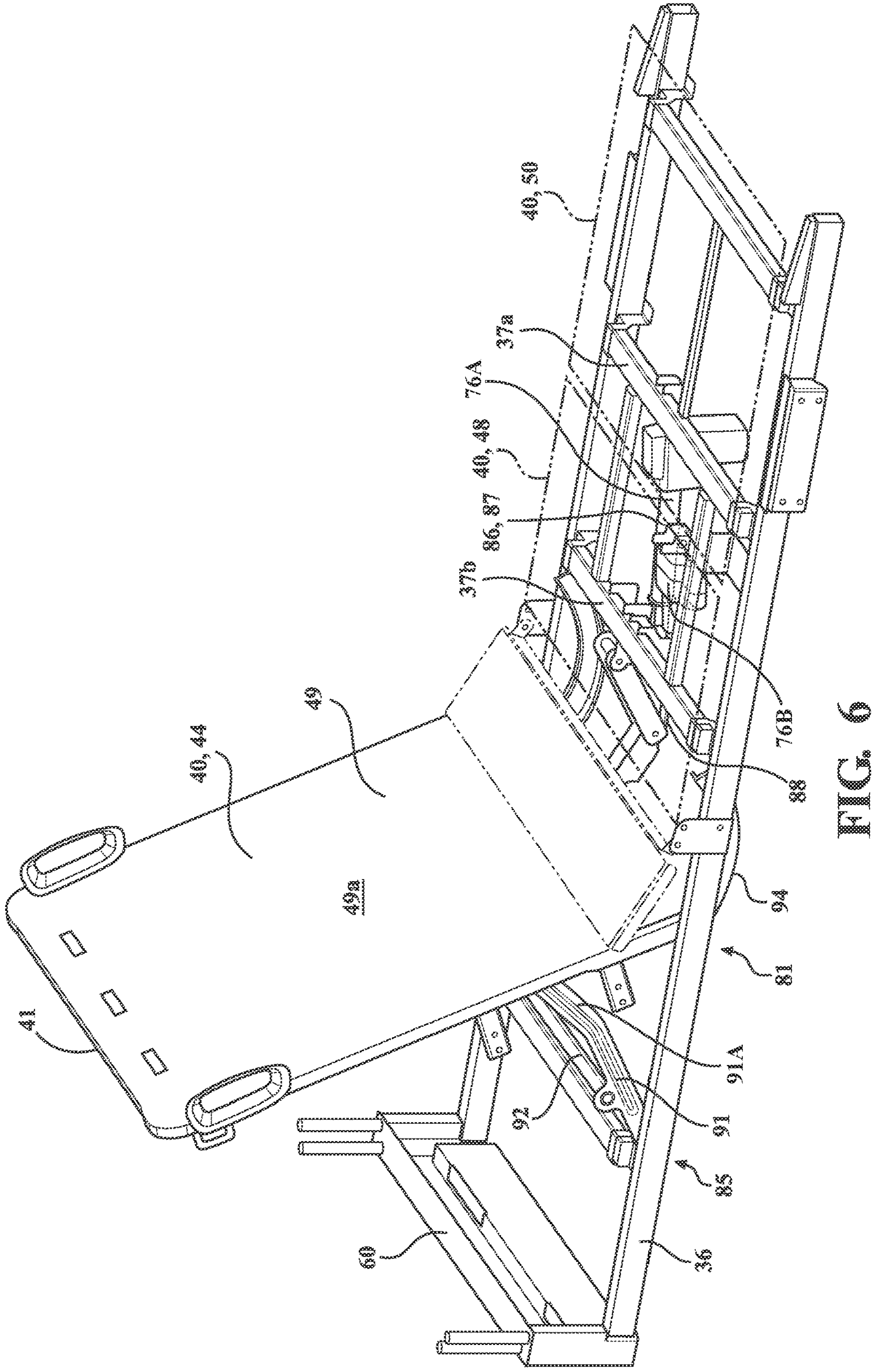
FIG. 6 is a perspective view of a portion of the support frame and patient support deck including the fowler deck section, with the fowler deck section positioned in a raised configuration.
Figure 7:
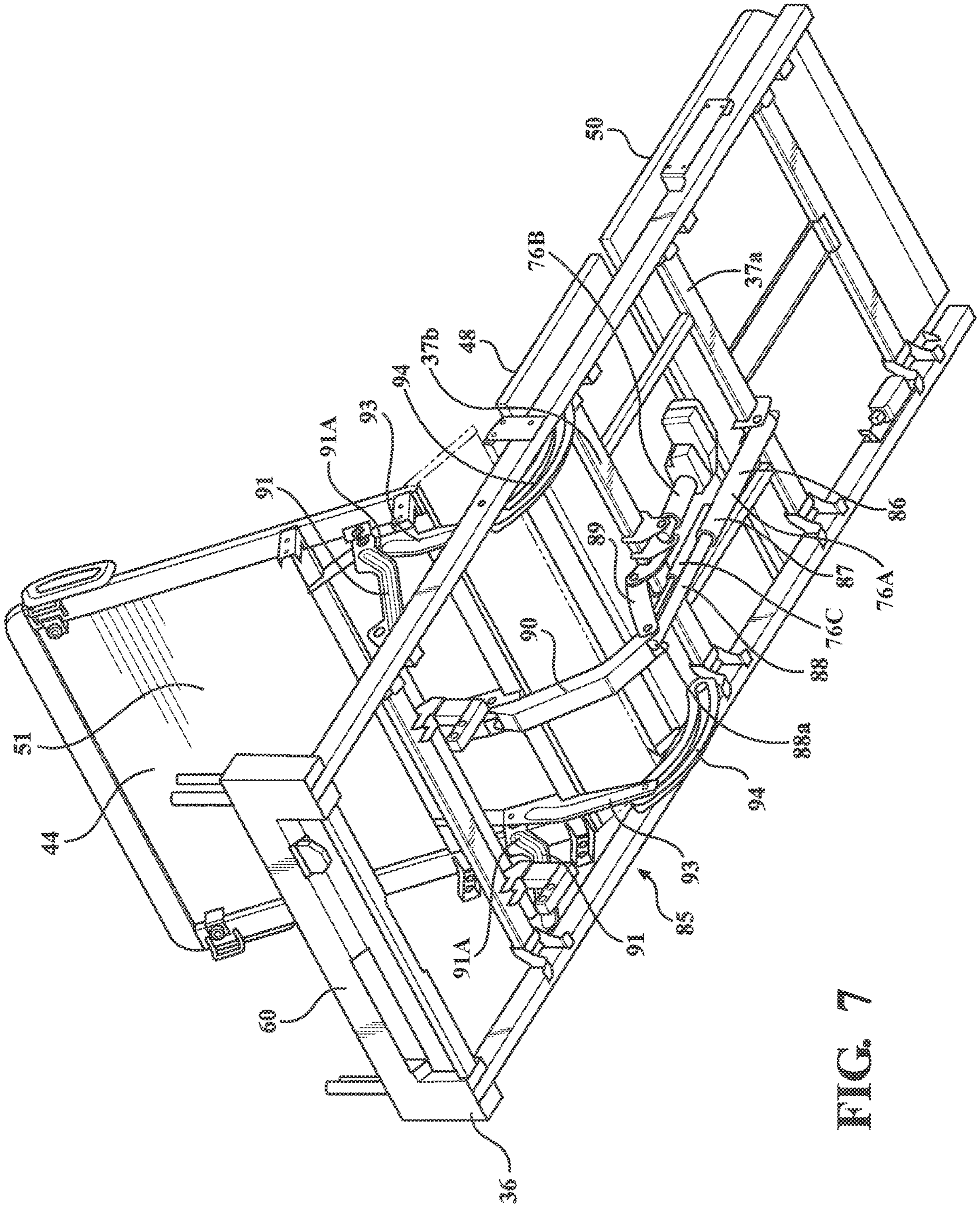
FIG. 7 is a bottom perspective view of FIG. 6.
Figure 12:
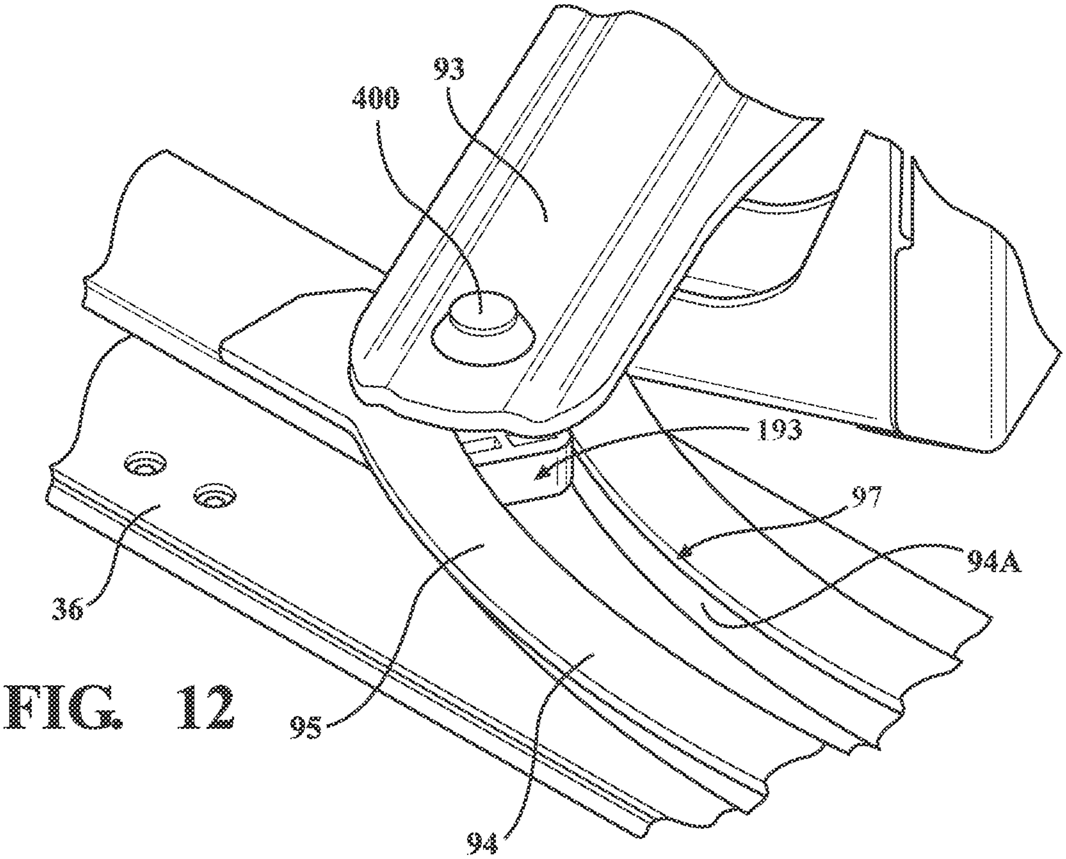
FIG. 12 is a close-up view of a portion of FIG. 11.
Figure 13:
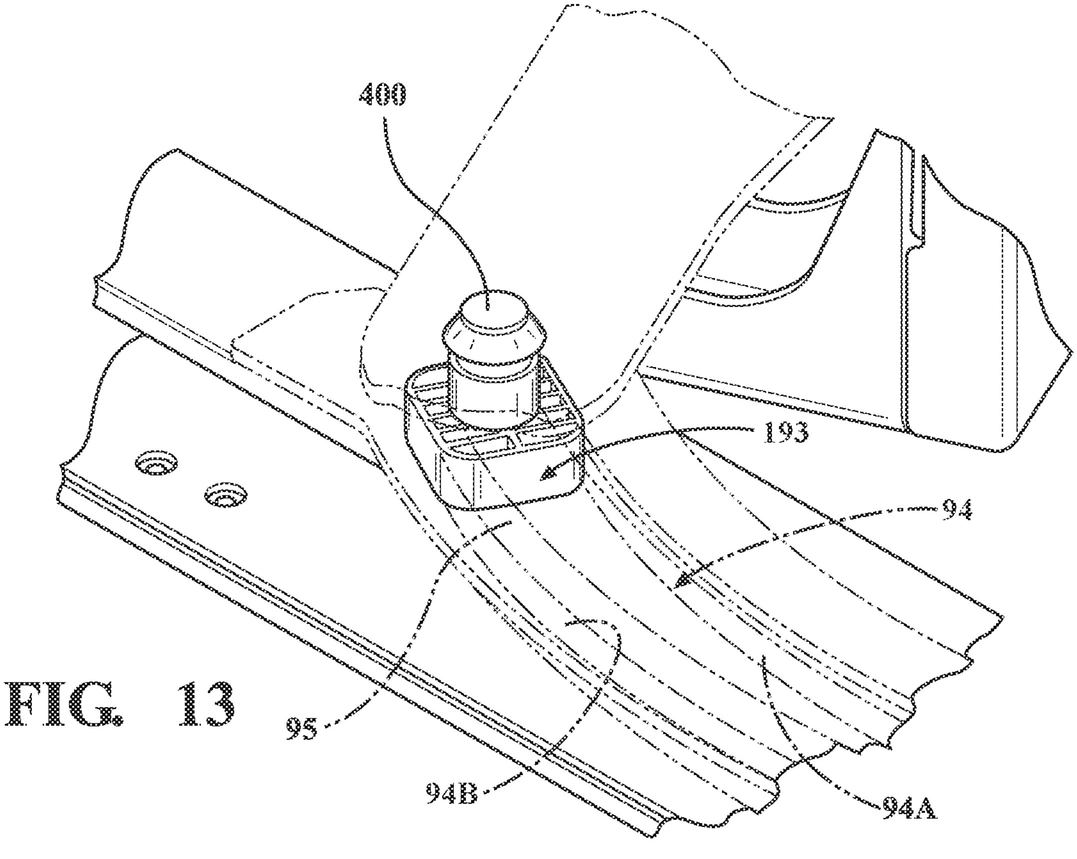
FIG. 13 is another perspective view of FIG. 12 in which portions of the structure are placed in phantom so that the sliding block member is visible within a curved slot region.

Referring to FIGS. 5 and 7, the actuator 76A has an actuator base 86 and an actuator shaft 88 configured to extend from a hollow tubular section 87 of the actuator base 86 between different linear positions, with a first linear position, a second linear position and an intermediate linear position (corresponding to the initial configuration, the maximum raised configuration, and one intermediate configuration) illustrated herein. The actuator base 86 is operatively attached to a cross member 37*a* of the support frame 36. For example, the actuator base 86 is shown pivotally connected to the cross members 37*a* via one or more brackets and pivot pins or shafts to allow pivotal motion of the actuator base 86 relative to the support frame 36. It should be noted that a different version of actuator 76A is shown in FIG. 7 as compared to FIG. 5.

The deck articulating assembly 81 includes a tension link 89 and a compression link, such as a c-shaped compression link 90, that are respectively pivotally coupled to the actuator 76A. In particular, an end portion 88*a* of the actuator shaft 88 of the actuator 86 (see FIGS. 5 and 7) is pivotally coupled to the tension link 89 and to the c-shaped compression link 90 via a pivot pin or shaft. The tension link 89 is also pivotally coupled to a cross member 37*b* of the support frame 36 which is disposed closer to the headboard 60 than cross-member 37*a*. The c-shaped compression link 90 is pivotally coupled to the bottom portion 51 of the fowler deck section 44. The tension link 89 and the c-shaped compression link 90 may be pivotally connected to the cross member 37*b*, and the bottom portion 51 of the fowler deck section 44 via one or more pivot brackets and associated pivot pins or shafts, and/or via other suitable connections.

A shock absorber 76C is operatively attached (e.g., pivotally connected) at one end to the support frame 36 at a position near the actuator 76A. The shock absorber 76C extends to a second end operatively attached (e.g., pivotally connected) to the tension link 89. The shock absorber 76C acts between the support frame 36 and the tension link 89 to assist in dampening rapid lowering of the fowler deck section 44, such as during an emergency release of the fowler deck section 44 from the actuator 76A, e.g., when a CPR handle is pulled on the patient support apparatus 30.

To aid in controlling the movement of the fowler deck section 44, in conjunction with the actuator 76A and deck articulating assembly 81, a guiding assembly 85, best shown in FIG. 7, is utilized. The guiding assembly 85 is coupled to the support frame 36 and fowler deck section 44. The guiding assembly 85 includes a pair of spaced apart timing links 91, a pair of follower members 93, and a pair of curved slot members 94 that aid the actuator 76A and deck articulating assembly 81 in controlling the movement of the fowler deck section 44 as it moves between the initial and raised configuration.

The pair of spaced apart timing links 91 are pivotally coupled to the bottom portion 51 of the fowler deck section 44 and to the support frame 36. A cross member 92 extends between and supports the spaced apart timing links 91. The timing links 91 are pivotally connected to the bottom portion 51 of the fowler deck section 44 and to the support frame 36 via one or more pivot brackets and pivots pins or shafts, and/or via other suitable connections.

The pair of follower members 93 are respectively fixed to the bottom portion 51 of the fowler deck section 44. In the embodiment shown, the follower members 93 comprise brackets fixed to the fowler deck section 44. The follower members 93 extend from the bottom portion 51 to outer ends. The follower members 93 further comprise guide members, such as rollers 93B (see hidden lines in FIGS. 8 and 9), that are rotatably coupled to the outer ends and ride within an interior portion of a respective one of the pair of curved slot members 94. The curved slot members 94 comprise arcuate brackets, with curved slots defined therein, which are fixed to an interior surface of the support frame 36.

The rollers 93B may smoothly roll within the curved slot members 94 from one end of the curved slots to the other during articulation of the fowler deck section 44 from the initial configuration to the raised configuration. In other versions, the guide members comprise guide blocks that slide in the curved slot members 94. The guide members and curved slot members 94 are closely dimensioned so that the guide members are constrained to move in a curved path defined by the curved slot members 94. Owing to this constraint, and the constraint imposed by the timing links 91, which are pivotally connected at their ends to the fowler deck section 44 and the support frame 36, the guiding assembly 85 acts to guide the movement of the fowler deck section 44 caused by operation of the actuator 76A through the deck articulating assembly 81.

Here, movement of the actuator 76A, whereby the shaft member 88 is moved such that it extends outwardly from the actuator base 86 (see, for example the movement of the shaft member 88 between an inward position in FIG. 8 to an outward position in FIG. 9) causes the fowler deck section 44 to move from an initial configuration (see FIGS. 4, 5 and 8) to a raised configuration (see FIGS. 6, 7 and 9), or to one or more intermediate configurations (one intermediate configuration is provided in FIG. 10) between the raised configuration and the initial configuration.

More specifically, the extension of the shaft member 88 applies compressive force on the c-shaped compression link 90, and causes tension on the tension link 89 as the tension link 89 pivots toward the headboard 60 relative to the cross-member 37*b*. At the same time, the c-shaped compression link 90 applies force to the bottom portion 51 of the fowler deck section 44 to move the fowler deck section 44. At the same time, the rollers 93B of the follower members 93 roll within the curved slot members 44, and ends 91A of the pair of spaced apart timing links 91 located adjacent to the bottom portion 51 of the fowler deck section 44 move upward, thereby positioning the length of the timing links 91 generally normal to the bottom portion 51 to enhance the stability of the fowler deck section 44 in the raised configuration.

The above-described operation and arrangement causes the first edge portion 41 of the fowler deck section 44 to move upwardly away from the support frame 36 (see for example a comparison of the positioning of the first edge portion 41 as it moves in FIGS. 8 and 9), and causes the second edge portion 43 to move in a direction longitudinally away from the adjacent deck section 40 (shown as leftward movement of the second edge portion 43 relative to the adjacent deck section 40 when comparing the positioning from FIG. 8 to FIG. 9) to the raised configuration. Such longitudinal movement is defined with respect to a longitudinal axis L of the support frame 36. In certain embodiments, the first edge portion 41 may also move longitudinally away from the adjacent deck section 40, and the second edge portion 43 may move upwardly away from the support frame 36. The upward and longitudinal movement caused by operation of the actuator 76A provided herein, is generally in the form of movement of the fowler deck section 44 along an arcuate path, e.g., the first edge portion 41 and second edge portion 43 follow the arcuate paths shown by broken lines in FIG. 9.

In some embodiments, the actuator 76A (and actuator 76B as well as any other actuators) is driven using a controller (not shown) to move the deck section 40 relative to the support frame 36. The controller may rely upon feedback from one or more electronic sensors, such as limit switches or position sensors, as well as the flow of electrical current through the actuator 76, to control/limit movement.

Figure 16:
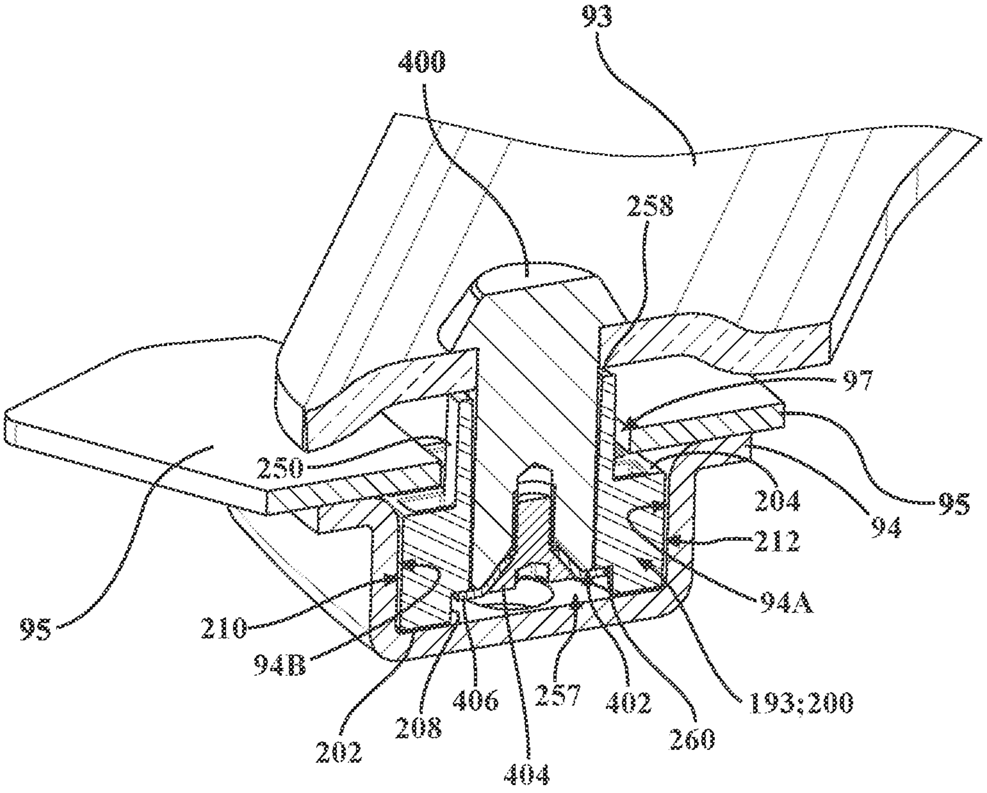
FIG. 16 is a partial sectional perspective view of portions of the support frame and guide member of FIGS. 11-13.

In further embodiments as shown in FIGS. 11-15, as opposed to utilizing rollers 93B as the guide members as in the embodiments of FIGS. 1-10, the guide members are in the form of sliding block members 193 (see FIGS. 11-15), with a respective one of the sliding block members 193 riding within an interior portion of a corresponding respective one of the pair of curved slot members 94. As best shown in FIGS. 14-16, the sliding block member 193 includes a base region 200 and a hollow tubular region 250 extending from the base region 200. The base region 200 has a generally rectangular profile and includes a lower surface 202 and an opposing upper surface 204. The base region 200 also includes exterior edge surface 206 and an interior edge surface 208 (see FIG. 16). The exterior edge surface 206 defines a first pair side edge surfaces 210, 212 and a second pair of side edge surfaces 214, 216, with a respective corner surface 218 connecting one of the first pair of side edge surfaces 210, 212 to a corresponding one of the second pair of side edge surface 214, 216. In the illustrated embodiment, the corner surfaces 218 are rounded to allow a smoother transition between one of the first pair of side edge surfaces 210 or 212 and a corresponding one of the second pair of side edge surface 214 or 216. Furthermore, and as is best depicted in FIG. 15, the first pair of side edge surfaces 210, 212 are each curved inwardly towards the hollow tubular region 250 between respective outer apexes 219 defined adjacent to the corner surfaces 218, whereas the second pair of side edge surfaces 214, 216 are arranged substantially parallel to each other.

The hollow tubular region 250 of the sliding block member 193 includes an exterior tubular surface 252 and an interior tubular surface 254, with the interior tubular surface 254 defining an internal cavity 256 there within disposed adjacent to a pocket 257 defined by the interior edge surface 208 of the base region 200 (see FIG. 16). In some embodiments, the internal cavity 256 has a generally frustoconical profile (see FIG. 16). Lower and upper tubular edge surfaces 258, 260 connect the exterior tubular surface 252 to the opposing interior tubular surface 254, with the upper tubular edge surface 260 defining a portion of the pocket 257 and being arranged between the lower and upper surfaces 202, 204 of the base region 200. In the illustrated embodiment, the sliding block member 193 is realized as a unitary, one-piece component which defines the hollow tubular region 250 and the base region 200. However, other configurations are contemplated.

The generally-rectangular profile of the base region 200 is defined by the first pair of side edge surfaces 210, 212 being arranged closer to each other (e.g., vertically between the apexes 219 in FIG. 15) than the second pair of side edge surfaces 214, 216 are (e.g., horizontally between each other in FIG. 15). This configuration helps ensure that the sliding block member 193 will be reliably installed within the curved slot member 94 in the correct manner. To this end, and as is shown in FIG. 14, the illustrated curved slot member 94 defines an upper interior side edge surface 94A and a lower interior side edge surface 94B. While not shown in detail, the interior side edge surfaces 94A, 94B are spaced from each other at a distance that smaller than the distance between the second pair of side edge surfaces 214, 216 of the base region 200 of the sliding block member 193, but that is larger than the distance between the apexes 219 of the first pair of side edge edges 210, 212. This ensures that the apexes 219 are disposed in sliding engagement with the upper interior side edge surface 94A of the curved slot member 94 during use, rather than one of the second pair of side edge surfaces 214, 216. More specifically, two of the apexes 219 will slide along the upper interior side edge surface 94A during use. Here, the curved profiles of the first pair of side edge surfaces 210, 212 may be adjusted relative to the geometry of the curved slot member 94 to ensure that the sliding block member 193 travels smoothly therein. In some embodiments, the curvature of the first pair of side edge surfaces 210, 212 may correspond or otherwise be defined based on the curvature of the curved slot member 94. Other configurations are contemplated.

As best shown in FIGS. 11-13 and 16, the base region 200 of the sliding block member 193 is disposed within the respective curved slot member 94, as noted above, with two of the apexes 219 disposed in sliding engagement with the upper interior side edge surface 94A. In some embodiments, the curved slot member 94 includes a retaining cover 95 to define a cover slot 97 which is disposed adjacent to the upper surface 204 of the base region 200 and through which the hollow tubular region 250 extends (see FIG. 16). This configurations helps ensure that the sliding block member 193 is retained within the curved slot member 94 after assembly and during operation of the patient support apparatus 30. The retaining cover 95 may be integrally formed with the curved slot member 94, may be a separate piece or pieces that are welded to the curved slot member 94, and the like.

As is best shown in FIG. 16, in the illustrated embodiment, a stud mount 400 is operatively attached to the follower member 93 to retain the sliding block member 193 thereto. To this end, the stud mount 400 is welded or otherwise coupled to the follower member 93, and extends to a distal stud end 402. The stud mount 400 has a generally cylindrical profile which is configured to be disposed within and extend through the internal cavity 256 of the hollow tubular region 250 of the sliding block member 193 to the pocket 257. Here, the stud mount 400 is provided with a tapped hole (not shown in detail) in which a fastener 404 is disposed. A keeper 406 (e.g., a thrust washer) disposed within the pocket 257 is arranged between the fastener 404 and the stud mount 400 to facilitate securing the sliding block member 193 to the stud mount 400 of the follower member 93. This configuration also allows the sliding block member 193 to rotate relative to the stud mount 400. It will be appreciated that the sliding block member 193 can be secured to the follower member 93 in various ways, including with stud mounts 400 of different types (e.g., a threaded bolt rather than a welded, tapped stud), with different components to facilitate rotation, and the like. Other configurations are contemplated, and the fastener member 400 may take on any alternative configuration to secure the sliding block member 193 to the follower member 93 that allows the sliding block member 193 to move in coordination with the follower member 93 within the curved slot member 94 as the guiding assembly 85 acts to guide the movement of the fowler deck section 44 caused by operation of the actuator 76A through the deck articulating assembly 81 as described above.

Accordingly, the sliding block member 193 slides within the curved slot member 94 in coordination with the movement of the follower member 93 as the guiding assembly 85 acts to guide the movement of the fowler deck section 44 caused by operation of the actuator 76A through the deck articulating assembly 81 in the same manner as described above with respect to FIGS. 1-10 in which the guide members are the rollers 93B.

The present disclosure thus provides a mechanism for moving a deck section 40, such as the fowler deck section 44, on a predefined path, such as an arcuate path, between the initial configuration and raised configuration in a smooth and continuous manner that provides comfort to a patient disposed on the mattress or patient support surface 42. The combination of the actuator 76A and deck articulating assembly 81 provides a stable and enhanced directed force to move the fowler deck section 44, and the guiding assembly 85 provides enhanced structural stability and path guidance to the fowler deck section 44 when moving relative to the support frame 36 to any of the configurations (initial, raised, or intermediate).

It is to be appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the disclosure to any particular form. The terminology which has been used is intended to be in the nature of words of description rather than of limitation. Many modifications and variations are possible in light of the above teachings and the disclosure may be practiced otherwise than as specifically described.

What is claimed is:

1. A patient support apparatus comprising:
- a support frame;
- a patient support deck operatively attached to the support frame, the patient support deck including a fowler deck section and a leg deck section;
- an actuator operatively attached between the support frame and the fowler deck section for moving the fowler deck section between an initial configuration and a raised configuration; and
- a guiding assembly coupled to the support frame and coupled to the fowler deck section for guiding the fowler deck section between the initial configuration and the raised configuration, the guiding assembly including:
  - a timing link pivotally coupled to the fowler deck section and to the support frame,
  - a curved slot member fixed to the support frame and defining an arcuate path, and
  - a follower member fixed to the fowler deck section and supporting a guide member for movement along the arcuate path of the curved slot member; and
- wherein an edge portion of the fowler deck section is spaced longitudinally further from a corresponding edge portion of the leg deck section in the raised configuration than in the initial configuration.

2. The patient support apparatus of claim 1, wherein the guide member comprises a roller.

3. The patient support apparatus of claim 1, wherein the guide member comprises a sliding block member.

4. The patient support apparatus of claim 1, wherein the guiding assembly comprises:
- a second timing link pivotally coupled to the fowler deck section and to the support frame;
- a second curved slot member fixed to the support frame and defining a second arcuate path; and
- a second follower member fixed to the fowler deck section and supporting a second guide member for movement along the second arcuate path of the second curved slot member.

5. The patient support apparatus of claim 4, wherein the guiding assembly further comprises a cross member fixed to the timing link and to the second timing link.

6. The patient support apparatus of claim 1, further comprising a deck articulating assembly including:
- a first link pivotally coupled to the actuator and pivotally coupled to the support frame; and
- a second link pivotally coupled to each of the actuator, the first link, and the fowler deck section.

7. The patient support apparatus of claim 6, wherein the first link comprises a tension link and wherein the second link comprises a compression link; and
- wherein the movement of the fowler deck section from the initial configuration to the raised configuration causes tension on the tension link and applies compressive force on the compression link.

8. The patient support apparatus of claim 7, wherein the compression link is c-shaped.

9. The patient support apparatus of claim 7, wherein the actuator includes:
- a base portion coupled to the support frame; and
- an actuator shaft movable relative to the base portion between a recessed position and an extended position, wherein movement of the actuator shaft toward the recessed position moves the fowler deck section toward the initial configuration, and wherein movement of the actuator shaft toward the extended position moves the fowler deck section toward the raised configuration.

10. The patient support apparatus of claim 9, wherein the tension link and the compression link are each pivotally coupled to the actuator shaft.

11. The patient support apparatus of claim 1, wherein the actuator comprises a linear actuator.

12. The patient support apparatus of claim 1, wherein the actuator is further configured for moving the fowler deck section to one or more intermediate configurations between the initial configuration and the raised configuration.

13. The patient support apparatus of claim 12, further comprising a controller coupled to the actuator and configured to control movement of the fowler deck section between the initial configuration, the raised configuration, and the one or more intermediate configurations.

14. The patient support apparatus of claim 1, wherein the edge portion of the fowler deck section is arranged facing towards the leg deck section.

15. The patient support apparatus of claim 14, wherein the fowler deck section further includes an opposite edge portion facing away from the leg deck section; and
- wherein the opposite edge portion of the fowler deck section is spaced further from the support frame in the raised configuration than in the initial configuration.

* * * * *